US008494372B2

(12) United States Patent
Eiselt et al.

(10) Patent No.: US 8,494,372 B2
(45) Date of Patent: Jul. 23, 2013

(54) APPARATUS AND METHOD FOR OPTIMIZING OPTICAL AND ELECTRICAL FILTERING OF OPTICAL SIGNALS

(75) Inventors: Michael H. Eiselt, Middletown, NJ (US); Lara Denise Garrett, Red Bank, NJ (US); Mark Shtaif, Fort Lee, NJ (US)

(73) Assignee: Pivotal Decisions LLC, Las Vegas, NV (US)

( * ) Notice: Subject to any disclaimer, the term of this patent is extended or adjusted under 35 U.S.C. 154(b) by 2290 days.

(21) Appl. No.: 10/427,210

(22) Filed: Apr. 30, 2003

(65) Prior Publication Data

US 2004/0013435 A1    Jan. 22, 2004

Related U.S. Application Data

(60) Provisional application No. 60/377,163, filed on Apr. 30, 2002.

(51) Int. Cl.
*H04B 10/00* (2006.01)

(52) U.S. Cl.
USPC ......................................................... 398/140

(58) Field of Classification Search
USPC ................. 398/140, 159, 182–183, 186, 198, 398/202
See application file for complete search history.

(56) References Cited

U.S. PATENT DOCUMENTS

| | | | |
|---|---|---|---|
| 4,229,831 A | 10/1980 | Lacher | |
| 4,535,459 A | 8/1985 | Hogge, Jr. | |
| 4,636,859 A | 1/1987 | Vernhet et al. | |
| 4,710,022 A | 12/1987 | Soeda et al. | |
| 5,224,183 A | 6/1993 | Dugan | |
| 5,225,922 A | 7/1993 | Chraplyvy et al. | |
| 5,267,071 A | 11/1993 | Little et al. | |
| 5,299,048 A | 3/1994 | Suyama | |
| 5,321,541 A | 6/1994 | Cohen | |
| 5,455,703 A * | 10/1995 | Duncan et al. | 398/136 |
| 5,559,625 A | 9/1996 | Smith et al. | |
| 5,613,210 A | 3/1997 | Van Driel et al. | |
| 5,726,784 A | 3/1998 | Alexander et al. | |
| 5,737,118 A | 4/1998 | Sugaya et al. | |
| 5,778,116 A | 7/1998 | Tomich | |
| 5,790,285 A | 8/1998 | Mock | |

(Continued)

FOREIGN PATENT DOCUMENTS

| | | |
|---|---|---|
| JP | 01115230 | 5/1989 |
| JP | 02238736 | 9/1990 |

OTHER PUBLICATIONS

"Receiver Optimization for 40-Gb/s Optical Duobinary Signal," IEEE Photonics Technology Letters, pp. 744-746, vol. 13 Jul. 7, 2001 to Zheng et al.*

(Continued)

*Primary Examiner* — Kenneth N Vanderpuye
*Assistant Examiner* — Abbas H Alagheband
(74) *Attorney, Agent, or Firm* — Woodcock Washburn LLP (57) ABSTRACT

The invention pertains to optical fiber transmission systems, and is particularly relevant to transmission of large volumes of data over long distances at high rates. An improved method and system for transmitting optical data over long distances using filtered return-to-zero (RZ) modulation format is disclosed. In particular, the improvement teaches the proper optical and electrical filtering of the optical signal at the receiver module.

31 Claims, 6 Drawing Sheets

U.S. PATENT DOCUMENTS

| | | | |
|---|---|---|---|
| 5,812,290 | A | 9/1998 | Maeno et al. |
| 5,877,881 | A | 3/1999 | Miyauchi et al. |
| 5,903,613 | A | 5/1999 | Ishida |
| 5,914,794 | A | 6/1999 | Fee |
| 5,914,799 | A | 6/1999 | Tan |
| 5,936,753 | A | 8/1999 | Ishikaawa |
| 5,940,209 | A | 8/1999 | Nguyen |
| 5,963,350 | A | 10/1999 | Hill |
| 5,995,694 | A | 11/1999 | Akasaka et al. |
| 6,005,702 | A | 12/1999 | Suzuki et al. |
| 6,021,245 | A | 2/2000 | Berger et al. |
| 6,038,062 | A | 3/2000 | Kosaka |
| 6,075,634 | A | 6/2000 | Casper et al. |
| 6,078,414 | A | 6/2000 | Iwano |
| 6,081,360 | A | 6/2000 | Ishikawa et al. |
| 6,084,694 | A | 7/2000 | Milton et al. |
| 6,088,152 | A | 7/2000 | Berger et al. |
| 6,108,074 | A | 8/2000 | Bloom |
| 6,122,095 | A | 9/2000 | Fatehi |
| 6,151,334 | A | 11/2000 | Kim et al. |
| 6,157,477 | A | 12/2000 | Robinson |
| 6,160,614 | A | 12/2000 | Unno |
| 6,163,392 | A | 12/2000 | Condict et al. |
| 6,163,636 | A | 12/2000 | Stentz et al. |
| 6,173,094 | B1 | 1/2001 | Bowerman et al. |
| 6,177,985 | B1 | 1/2001 | Bloom |
| 6,198,559 | B1 | 3/2001 | Gehlot |
| 6,229,599 | B1 | 5/2001 | Galtarossa |
| 6,236,481 | B1 | 5/2001 | Laor |
| 6,236,499 | B1 | 5/2001 | Berg et al. |
| 6,246,510 | B1 | 6/2001 | BuAbbud et al. |
| 6,259,553 | B1 | 7/2001 | Kinoshita |
| 6,259,554 | B1 | 7/2001 | Shigematsu et al. |
| 6,259,693 | B1 | 7/2001 | Ganmukhi et al. |
| 6,259,845 | B1 | 7/2001 | Sardesai |
| 6,272,185 | B1 | 8/2001 | Brown |
| 6,275,315 | B1 | 8/2001 | Park et al. |
| 6,288,811 | B1 | 9/2001 | Jiang et al. |
| 6,288,813 | B1 | 9/2001 | Kirkpatrick et al. |
| 6,307,656 | B2 | 10/2001 | Terahara |
| 6,317,231 | B1 | 11/2001 | Al-Salameh et al. |
| 6,317,255 | B1 | 11/2001 | Fatehi et al. |
| 6,323,950 | B1 | 11/2001 | Kim et al. |
| 6,327,060 | B1 | 12/2001 | Otani et al. |
| 6,356,384 | B1 | 3/2002 | Islam |
| 6,359,729 | B1 | 3/2002 | Amoruso |
| 6,388,801 | B1 | 5/2002 | Sugaya et al. |
| 6,396,853 | B1 | 5/2002 | Humphrey et al. |
| 6,519,082 | B2 | 2/2003 | Ghera et al. |
| 6,781,692 | B1 * | 8/2004 | Rosencwaig .................. 356/369 |
| 2001/0005271 | A1 | 6/2001 | Leclerc et al. |
| 2001/0007605 | A1 | 7/2001 | Inagaki et al. |
| 2001/0009468 | A1 | 7/2001 | Fee |
| 2001/0014104 | A1 | 8/2001 | Bottorff et al. |
| 2002/0012152 | A1 | 1/2002 | Agazzi et al. |
| 2002/0015220 | A1 | 2/2002 | Papernyl et al. |
| 2002/0034197 | A1 | 3/2002 | Tornetta et al. |
| 2002/0044317 | A1 | 4/2002 | Gentner et al. |
| 2002/0044324 | A1 | 4/2002 | Hoshida et al. |
| 2002/0048287 | A1 | 4/2002 | Silvers |
| 2002/0051468 | A1 | 5/2002 | Ofek et al. |
| 2002/0063948 | A1 | 5/2002 | Islam et al. |
| 2002/0064181 | A1 | 5/2002 | Ofek et al. |
| 2002/0075903 | A1 | 6/2002 | Hind |
| 2002/0080809 | A1 | 6/2002 | Nicholson et al. |
| 2002/0101641 | A1 * | 8/2002 | Kurchuk ....................... 359/189 |
| 2002/0186917 | A1 * | 12/2002 | Kalinowski ..................... 385/18 |
| 2005/0084270 | A1 * | 4/2005 | Caplan et al. .................. 398/141 |

OTHER PUBLICATIONS

"Experimental verification of optimum filter bandwidths in direct-detection (N)RZ receivers limited by optical noise," Lasers and Electro-Optics Society, 2001. LEOS 2001. The 14th Annual Meeting of the IEEE, Nov. 2001.*

* cited by examiner

APPARATUS AND METHOD FOR OPTIMIZING OPTICAL AND ELECTRICAL FILTERING OF OPTICAL SIGNALS

CROSS-REFERENCE TO RELATED APPLICATION

This application claims priority to U.S. Provisional Patent Application Ser. No. 60/377,163, entitled "GENERATION AND NARROW BANDWIDTH DETECTION OF RZ DATA," by Michael H. Eiselt, et al., filed Apr. 30, 2002, the content of which is incorporated by reference herein in its entirety.

TECHNICAL FIELD OF THE INVENTION

The present invention relates, in general, to the field of optical communications, and in particular to, an optical transport system that uses an improved modulation technique based on proper filtering of a return-to-zero (RZ) waveform.

BACKGROUND OF THE INVENTION

A goal of many modem long haul optical transport systems is to provide for the efficient transmission of large volumes of voice traffic and data traffic over trans-continental distances at low costs. Various methods of achieving these goals include time division multiplexing (TDM) and wavelength division multiplexing (WDM). In time division multiplexed systems, data streams comprised of short pulses of light are interleaved in the time domain to achieve high spectral efficiency, high data rate transport. In wavelength division multiplexed systems, data streams comprised of short pulses of light of different carrier frequencies, or equivalently wavelength, are co-propagated in the same fiber to achieve high spectral efficiency, high data rate transport.

The transmission medium of these systems is typically optical fiber. In addition there is a transmitter and a receiver. The transmitter typically includes a semiconductor diode laser, and supporting electronics. The laser may be directly modulated with a data train with an advantage of low cost, and a disadvantage of low reach and capacity performance. After binary modulation, a high bit may be transmitted as an optical signal level with more power than the optical signal level in a low bit. Often, the optical signal level in a low bit is engineered to be equal to, or approximately equal to zero. In addition to binary modulation, the data can be transmitted with multiple levels, although in current optical transport systems, a two level binary modulation scheme is predominantly employed.

Often, the modulator is separate from the laser diode. This allows for a carrier signal with higher spectral purity and higher reach and capacity performance. One modulator may be used to directly encode the data onto the laser signal. For example, one modulator may be used to achieve a non-return-to-zero (NRZ) format. In a non-return-to-zero format, the instantaneous power of a high optical signal does not return to the low value between adjacent high data bits.

For best long haul transmission performance, the return-to-zero (RZ) performance is used. RZ signals, however, exhibit a larger bandwidth than NRZ signals. In practice, a two stage modulator may also be used to achieve this improved performance. For example, a first modulator may be used to shape a train of all high optical pulses with good contrast to the low value between pulses. A second modulator may then be used to encode the data onto this stream of pulses, effectively attenuating those bits that are to be encoded as zeros.

The receiver is located at the opposite end of the optical fiber from the transmitter. The receiver is typically comprised of a semiconductor photodetector and accompanying electronics. Current systems are designed with the belief that the large bandwidth of RZ pulses requires a wide bandwidth receiver. While for NRZ signals, the optimum electrical receiver 3 dB-bandwidth is about 0.7 times the bit rate, the optimum electrical receiver bandwidth for RZ signals has, in prior art, been assumed to be at least 1.0 times the bit rate. This assumption has led to systems that are sub-optimal, and there is a need for a system with the correct receiver bandwidth for improved performance.

SUMMARY OF THE INVENTION

In the present invention, improvements to the receiver module of a fiber optic data transmission system are taught for improved signal-to-noise performance.

In one embodiment of the invention, a preferred electrical receiver bandwidth for RZ signals is taught.

In another embodiment of the invention, a preferred balance of optical to electrical receiver bandwidth is taught.

In another embodiment of the invention, the inclusion of tunable filters at the receiver module is taught for maintaining optimal performance.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which.

DETAILED DESCRIPTION OF THE INVENTION

While the making and using of various embodiments of the present invention are discussed in detail below, it should be appreciated that the present invention provides many applicable inventive concepts that can be embodied in a wide variety of specific contexts. The specific embodiments described herein are merely illustrative of specific ways to make and use the invention and do not delimit the scope of the invention.

Figure 1:
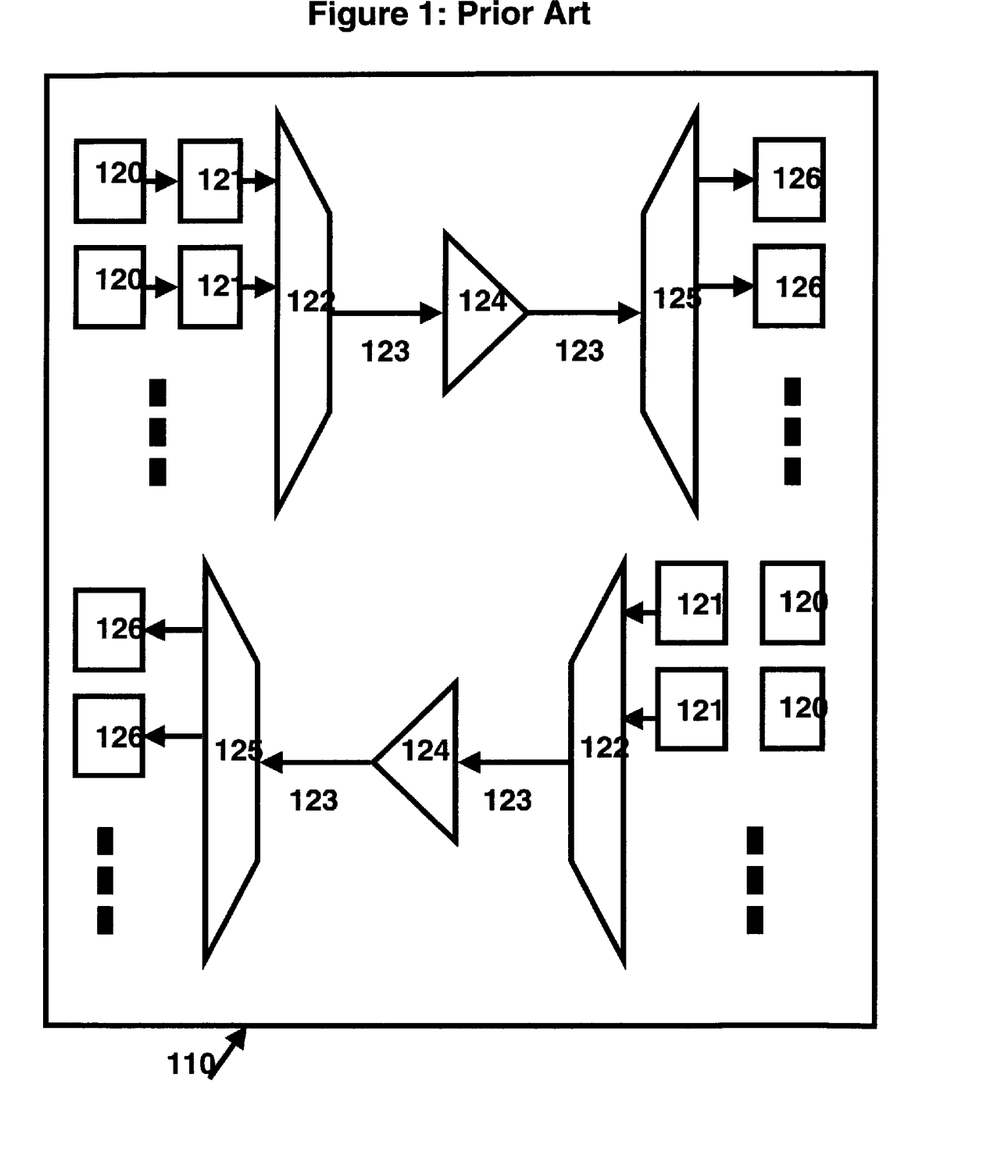
FIG. 1 is a schematic illustration of a prior art multiplexed optical transport system.

FIG. 1 is an illustrative block diagram of an optical transport system 110 for data and/or voice transmission used to support the present invention. Typical long haul optical transport dense wavelength division multiplexed (DWDM) systems transmit 40 to 80 channels at 10 Gbps (gigabit per second) across distances up to 6000 km in a single 30 nm spectral band. A duplex system in which traffic is both transmitted and received between parties at opposite ends of the link is shown in the figure. The optical carrier is generated using laser transmitters 120. In current DWDM long haul transport systems laser transmitters 120 are DFB lasers stabilized to specified frequencies on the ITU frequency grid. In many systems, the carrier is externally modulated using a modulator 121. A single stage modulator is sufficient for an NRZ modulation format. With current devices, this single modulator may be a lithium niobate modulator that would be external to the laser. Alternatively, an external, electro-absorptive modulator may be integrated with the laser. Alternatively, in short reach systems, the laser may be modulated by direct modulation of the excitation injection current.

In a DWDM system, different channels operating at distinct carrier frequencies are multiplexed using a multiplexer 122. Such multiplexers may be implemented using arrayed waveguide grating (AWG) technology or thin film technology, or a variety of other technologies. After multiplexing, the optical signals are coupled into the transport fiber 123 for transmission to the receiving end of the link. The total link distance in today's optical transport systems may be two different cities separated by continental distances ranging from 1000 km to 6000 Ian, for example. To successfully bridge these distances with sufficient optical signal power relative to noise, the signal is periodically amplified using an in line optical amplifier 124. Typical span distances between optical amplifiers 124 are 50 to 100 km. Thus, for example, thirty 100 km spans would be used to transmit optical signals between points 3000 km apart. Examples of inline optical amplifiers 124 include erbium-doped fiber amplifiers (EDFAs) and semiconductor optical amplifiers (SOAs).

At the receiving end of the link, the optical channels are demultiplexed using a demultiplexer 125. Such demultiplexers may be implemented using AWG technology or thin film technology, or a variety of other technologies. Each channel is then optically coupled to a separate optical receiver 126.

The optical receiver 126 is typically comprised of a semiconductor photodetector and accompanying electronics. Current systems are designed with the belief that the large bandwidth of RZ pulses requires a wide bandwidth receiver. While for NRZ signals, the 3 dB-bandwidth is about 0.7 times the bit rate, the optimum electrical receiver bandwidth for RZ signals has, in prior art, been assumed to be at least 1.0 times the bit rate. This assumption has led to systems that are suboptimal, and there is a need for a system with the correct receiver bandwidth for improved performance.

It is a purpose of this invention to teach improved receiver modules for improved optical signal to noise performance, and these improvements will be discussed in more detail below.

It should be noted that FIG. 1 depicts an optical transport system 110 supporting duplex operation wherein each endpoint can both send and receive voice and data traffic. This is important to achieve a typical conversation. In FIG. 1, duplex operation is shown to use two distinct fibers, the both together often referred to as a fiber pair. FIG. 1 is by-restrictive in this or in many other instances. For example, optical transport systems are sometimes deployed with bidirectional traffic providing duplex service on a single fiber.

Other common variations include the presence of post-amplifiers and pre-amplifiers just before and after the multiplexer 122 and demultiplexer 125. Often, there is also included dispersion compensation with the in line amplifiers 124. These dispersion compensators adjust the phase information of the optical pulses in order to compensate for the chromatic dispersion in the optical fiber while appreciating the role of optical nonlinearities in the optical fiber. Another variation that may be employed is the optical dropping and adding of channels at cities located in between the two end cities. The invention disclosed herein would find application in any of these variations, as well as others. For example, the improved receiver module taught herein would benefit short-reach, or metro applications that may not include an inline optical amplifier 124.

Figure 2:
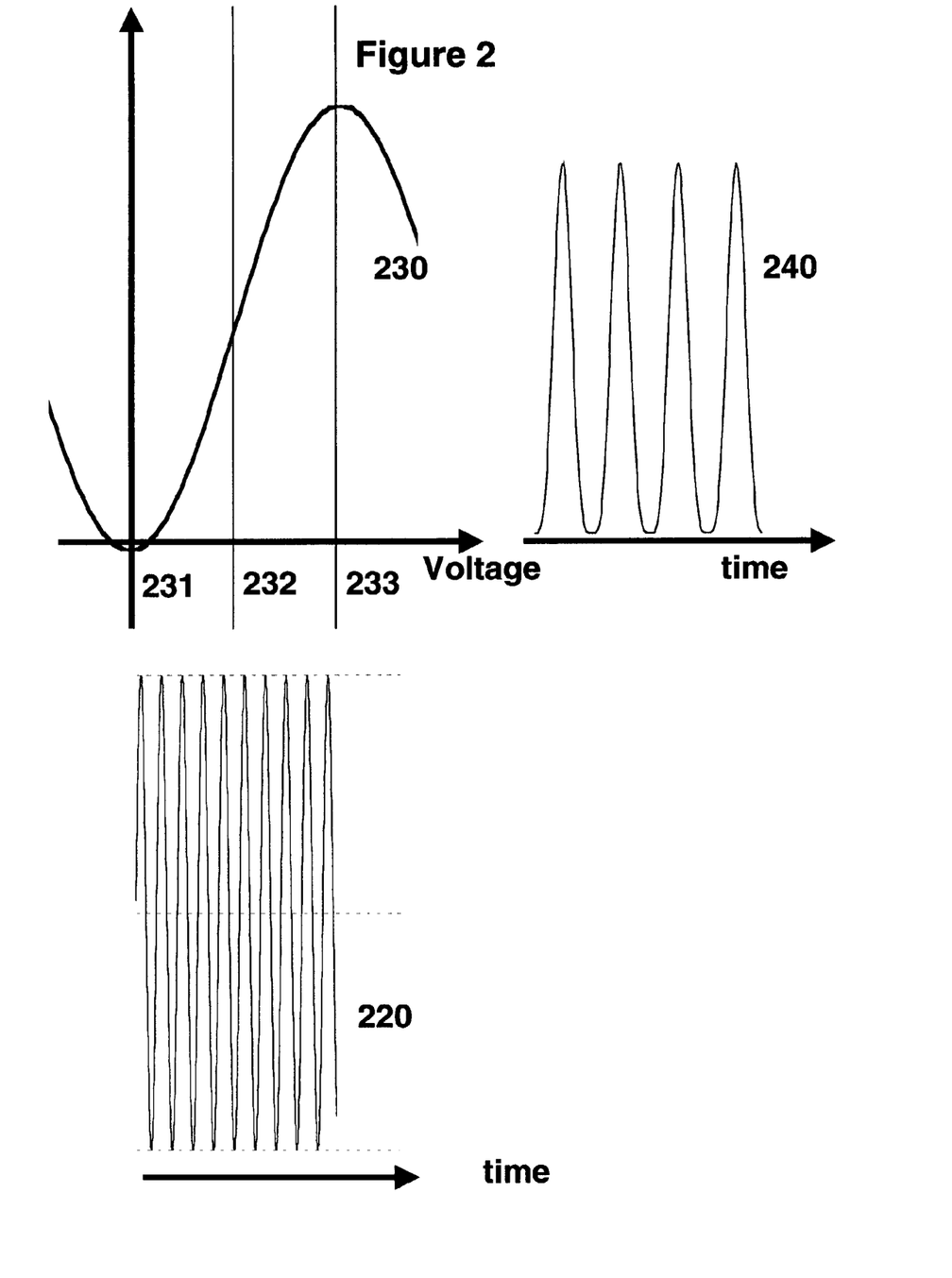
FIG. 2 is a schematic illustration of return-to-zero modulation format.

In FIG. 2 is shown the generation of a train of RZ modulation format pulses. In the example discussed here, and shown in FIG. 2, the pulse stream has a 50% duty cycle, but it will be understood by one skilled in the art, that operational modifications may be made to this example in different systems. Waveform 220 is the drive voltage on an amplitude modulator, for example a Mach-Zehnder amplitude modulator, as is known in the art. The drive voltage shown in FIG. 2 is a sinusoidal waveform, but the invention herein holds for alternate waveforms. The modulator characteristics are shown via waveform 230 that is the modulating power versus drive voltage. For a Mach-Zehnder, the modulator characteristic waveform 230 is shown as approximately sinusoidal. Other modulators with different modulator characteristics may also be employed in this invention. The modulator is shown as biased at the quadrature point 232. The peak of the modulator waveform is a voltage called $V_\pi$ 233. To generate the 50% duty cycle pulse train, the peak-to-peak modulation amplitude of the drive voltage is set equal to $V_\pi$ 233. The resulting optical pulse train is waveform 240 in FIG. 2. The spacing between adjacent pulses on this pulse train is the pulse repetition period, and is determined by the frequency of waveform 220. The reciprocal of this pulse repetition period is the bit rate. For example, a SONET OC-192 signal has a native bit rate of approximately 10 Gbps. This bit rate may be increased if forward error correction (FEC) is employed.

The actual customer data is encoded on the pulse train by a subsequent amplitude modulator, which is commonly implemented as a second Mach-Zehnder amplitude modulator. Often, the two Mach-Zehnder amplitude modulators are integrated in the same package, and even on the same lithium niobate substrate.

Other pulse modulation schemes are known, including the "half-rate scheme." In the half-rate scheme, the Mach-Zehnder modulator is biased either at the maximum 233 or the minimum 231 of the transmission curve 230. Here, the drive waveform 220 comprises a sinusoidal signal with a frequency of half the bit rate and a peak-to-peak amplitude equal to 2 $V_{90}$. These schemes require a frequency divider to obtain a signal at half the bit rate from the data clock. Also, a higher power amplifier to amplify the sinusoidal signal is required. The electrical power for the half-rate scheme is four times the power needed for the modulation scheme illustrated in FIG. 2.

Another pulse modulation scheme is known as "electrical RZ". In the electrical RZ scheme, the data and sinusoidal pulse waveforms are multiplied in the electronic domain. The resulting RZ-encoded electrical signal is then used to drive a modulator with sufficient electrical bandwidth. This scheme requires high-speed electronics and electrical amplification for the electrical-RZ signal generation process.

Figure 3:
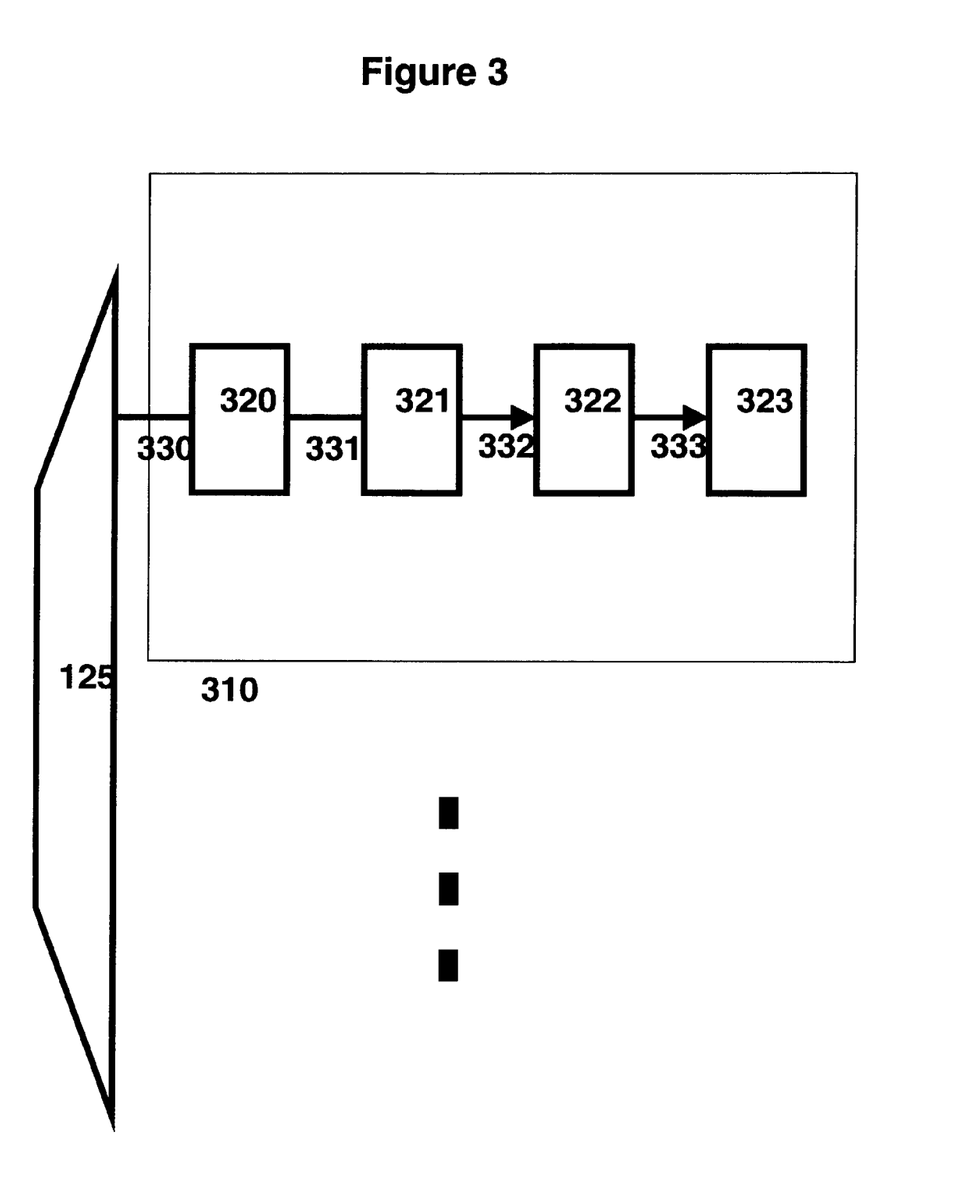
FIG. 3 is a schematic illustration of an optical receiver module depicting optical and electrical filtering.

In FIG. 3 is a block diagram of a receiver module 310 of the present invention shown in relationship to the demultiplexer 125 of optical transport system 110. The receiver module is comprised of an optical filter 320, a transducer 321 to convert optical signals to electrical signals, an electrical filter 322 and subsequent amplification and decision circuitry 323.

Optical demultiplexer 125 is optically coupled to optical filter 320 via optical coupling means 330. Optical filter 320 is optically coupled to transducer 321 via optical coupling means 331. Representative examples of optical coupling means 330 and 331 include fiber pigtails, free space coupling potentially including focusing elements, or other optical transmitting structure. Transducer 321 is electrically coupled to electrical filter 322 via electrical coupling means 332. Electrical filter 322 is electrically coupled to decision circuitry 323 via electrical coupling means 333. Because of the high bit rate electrical coupling means 332 and 333 are typically designed in accordance to radio frequency RF design techniques using stripline or coaxial waveguides and impedance matching techniques. Further, electrical coupling means 332 and 333 may have a frequency response with a bandwidth filtering property, and this frequency response may be included in the design of the proper filtering of a return-to-zero (RZ) waveform that is disclosed in this invention.

Optical filter 320 may be included in the optical block of the receiver module in order to eliminate out of band noise that may leak through the optical demultiplexer. Amplified spontaneous emission (ASE) from the EDFAs is a common source of this out of band noise, but nonlinearities in the fiber also contributes to out-of-band noise. Thin film bandpass filters are a good choice for this component. The optical filter should be sufficient to pass both the signal and both RZ sidebands. In the preferred embodiment, the optical filter bandwidth is approximately 50 GHz. The transducer 321 converts the optical signal to an electrical signal. One embodiment is a fast semiconductor PIN photodiode, or high bandwidth photodetector. Avalanche photodiodes may also be used, but these generally require high voltage to operate, a practical disadvantage. Typical transducers 321 have a square law detection characteristic that recreates information modulated onto the carrier by the transmission system as base-band signals.

The electrical filter 322 should be included in order to optimize the signal to noise ratio (SNR) and minimize the bit error rate (BER). If the bandwidth of the filter is too large, then additional noise can enter the decision circuitry. On the other hand, if the bandwidth of the filter is too narrow, then too much of the signal power will be attenuated. One aspect of this invention teaches that between about 0.4-0.6 times the bit rate is an effective choice for the 3 dB electrical filter bandwidth.

Decision circuitry 323 optimally converts the analog base-band signal to either a 0 or a 1 binary digital signal. The decision circuitry may include clock recovery in order to extract a clock signal synchronous with and at the rate of the received signal, a quantizer wherein voltages above a threshold are assigned a mark, or a one, and voltages below the threshold are assigned a space or a zero, and a latch to retime the quantized data signal with the recovered clock to produce a data signal with minimum amplitude and phase distortion.

Figure 4:
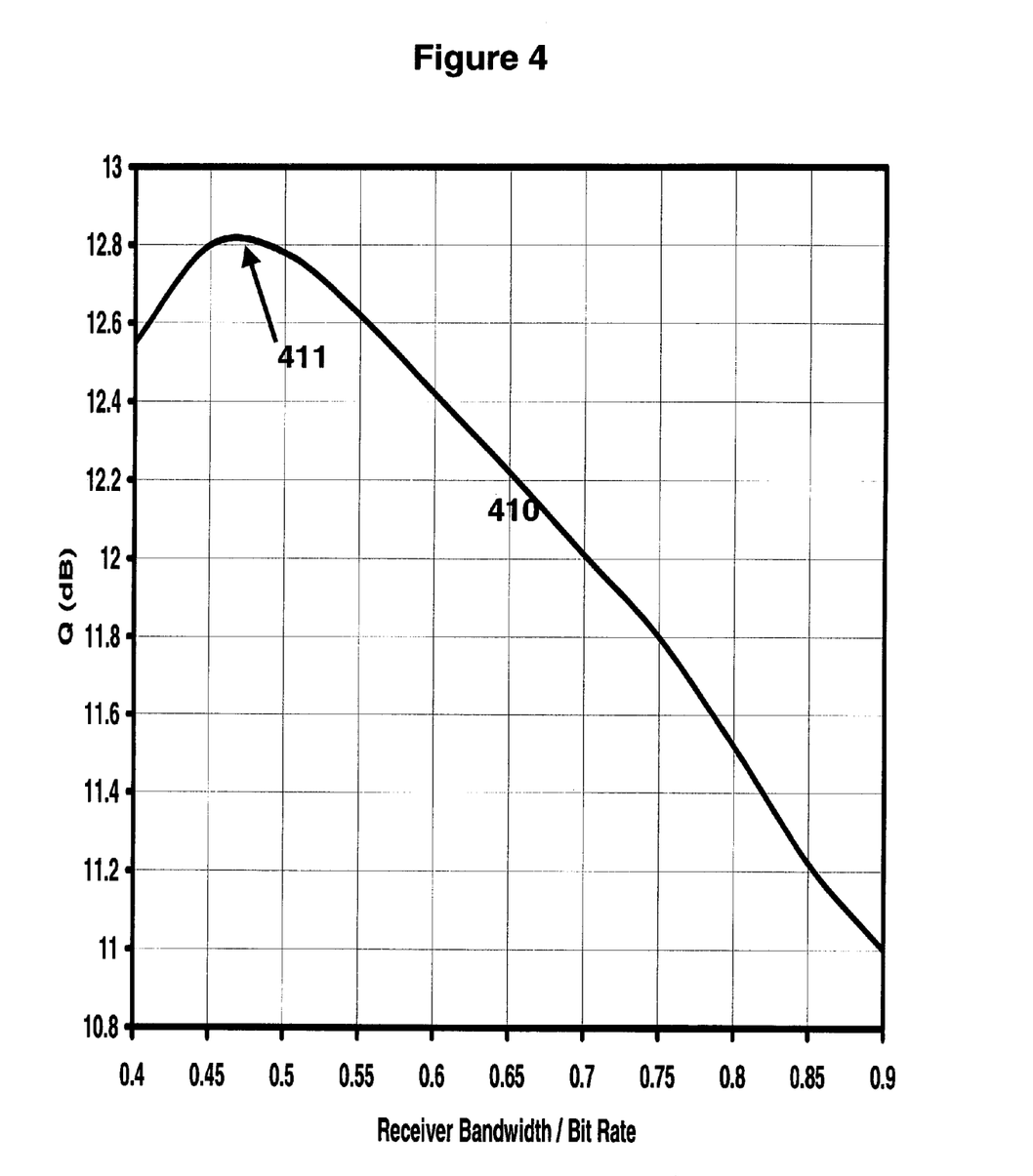
FIG. 4 is a design plot showing the impact of receiver bandwidth on signal quality.

In FIG. 4 is shown a typical impact curve 410 which is the Q-factor versus electrical receiver filter 322 3 dB-bandwidth. The Q-factor is a measure of the signal to noise ratio of a digital signal, and can be correlated to the bit error rate of the signal. The Q-factor is defined as the difference between the average value of a one at the receiver and the average value of a zero at the receiver divided by the sum of the standard deviation of the zero values and the standard deviation of the one values. The impact curve 410 is plotted for a typical 50% duty cycle RZ modulation scheme. In constructing this curve, a $10^{th}$ order Bessel filter was used as electrical filter 322. The optimum 411 of the impact curve 410 is located at a receiver filter 322 bandwidth of 0.45 to 0.5 times the bit rate. The precise values for the y axis, the Q-factor, is shown in FIG. 4, calculated for an optical transport system 110 comprised of 60 spans of non-zero dispersion shifted fiber (NZDSF). Each of these spans corresponds to a fiber length of approximately 100 km. Increasing the electrical filter bandwidth to the typical value of 0.7 times the bit rate introduces a Q factor penalty of about 12 dB. Further increase of the filter bandwidth deteriorates the signal even further. This occurs because a wider filter bandwidth increases the noise power passing to the decision circuit, while the signal power is increased by a smaller fraction. Another contribution to this improvement is that the reduced signal bandwidth increases the duty cycle of the pulse which, in turn, increases the width of the phase window for the decision circuit. A lower receiver bandwidth than 0.4 times the bit rate reduces the amount of noise further, but inter-symbol interference between consecutive bits deteriorates the signal quality.

In accordance with one aspect of this invention, the bandwidth of the optical filter or the electrical filter may be a tunable or adjustable filter. These filters may therefore be tuned or adjusted upon installation of the optical transport system, or at other times to provide or maintain optimal performance. For example, upon installation, the bit rate information can be measured or otherwise obtained and that information may be used to set the filter bandwidth to between about 0.4 and 0.6 of the bit rate. Variation of these ranges may available as long as performance is not substantially degraded. This tunability is useful because, in practice, optical transport systems may operate at different bit rates for different channels. This can arise through the use of different FEC schemes, or from the different data rates assigned in different data standards. For example, the data rate of the LAN standard of 10 Gb Ethernet is not exactly equal to the data rate of the OC-192 SONET data standard.

Figure 5:
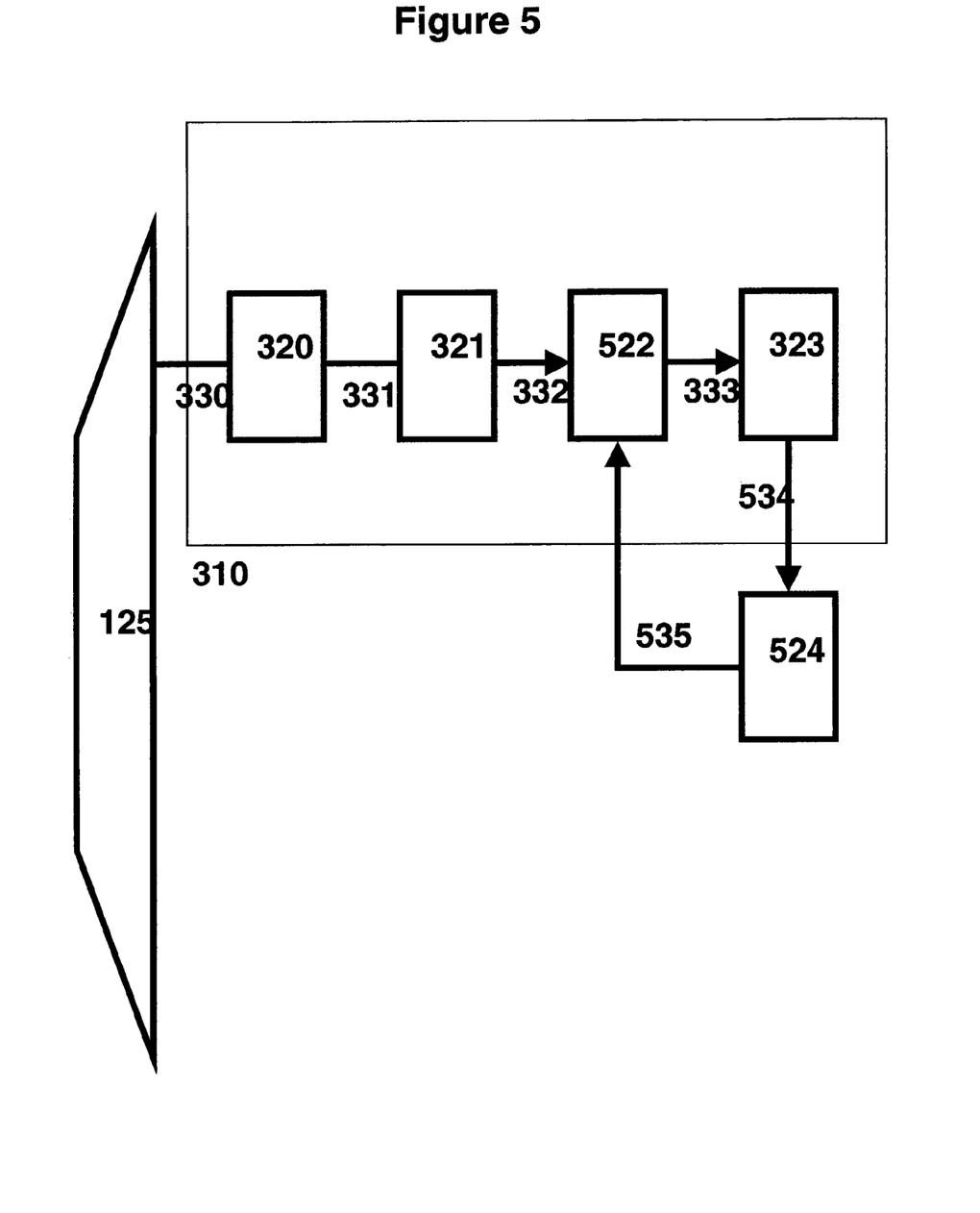
FIG. 5 is a schematic illustration of an optical receiver module depicting the use of a tunable electrical filter.

In FIG. 5 is shown a block diagram of a receiver module comprising a tunable electrical filter 522. Tunable electrical filter 522 is shown in the context of receiver block 310. Tunable electrical filter 522 may be implemented, in a preferred embodiment, with stripline or transmission line electrical components including, for example, a tunable capacitance or tunable inductance. In this embodiment, the bandwidth of tunable electrical filter 522 may be adjusted by tuning the capacitance or tuning the inductance. The tunable capacitor may be realized using micro-electromechanical machine (MEMS) technology. For example, a MEMS parallel plate capacitor may be tuned by adjusting the spacing between the plates. In another preferred embodiment, tunable electrical filter 522 may be implemented with a voltage controllable element such as a varactor diode, a field effect transistor, or other electrical circuit element whereby the bandwidth of tunable electrical filter 522 may be adjusted by changing a voltage control signal.

Tunable electrical filter 522 is electrically coupled to filter control block 524. Filter control block 524 is shown electrically coupled to decision circuitry 323 either directly or through intermediate elements. In a preferred embodiment, filter control block 524 comprises hardware and software and adjusts tunable filter 522 in accordance with an input signal so that the electrical filter bandwidth provides optimal performance. The input signal to the filter control block may be obtained from decision circuitry 323, or from other elements of optical transport system 110, for example from modulator 121 through a system control communication channel.

It will be clear to one skilled in the art that a tunable optical filter may be used in conjunction with a tunable electrical filter to achieve optimal performance, including a preferred balance of optical to electrical receiver bandwidth.

Figure 6:
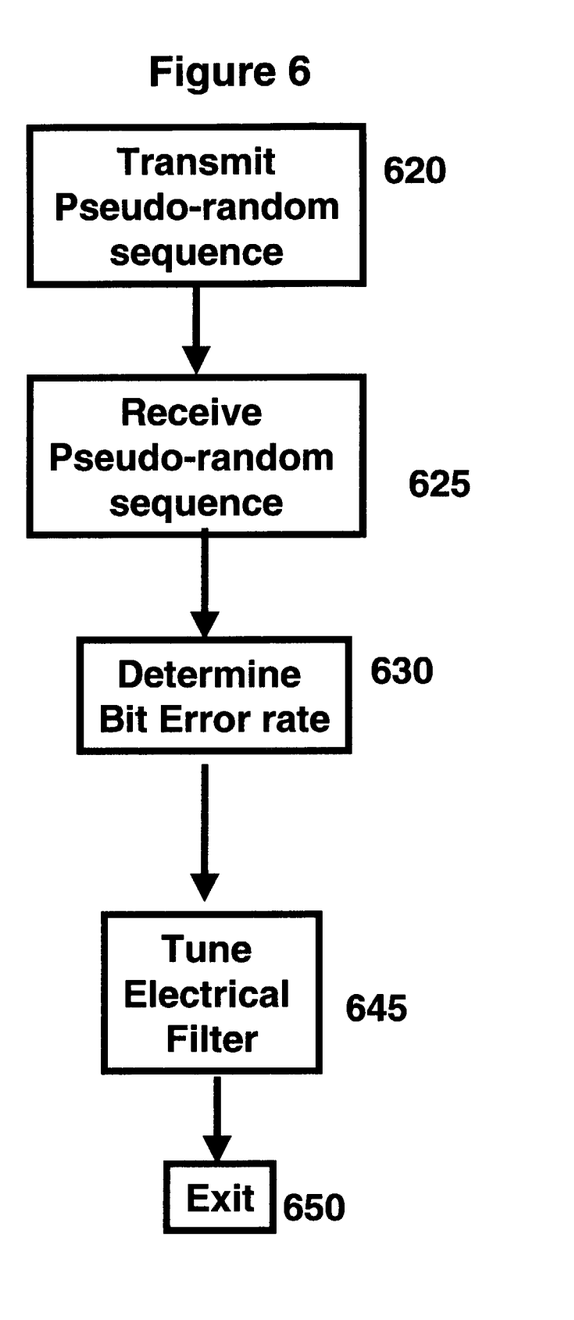
FIG. 6 is a flow chart to determine optimal receiver characteristics with a tunable electrical filter.

In FIG. 6 is shown a flow chart illustrating a method of adjustment of a tunable electrical filter based upon a Bit Error Rate (BER) test. This algorithm may be used to achieve a preferred balance of tunable electrical filter bandwidth in relation to optical filter bandwidth. A BER is the average rate at which the receiver measures received bits incorrectly. Typical BERs for today's optical transport systems are $10^{-12}$ to $10^{-15}$. A BER of $10^{-15}$ implies that one erroneous reading is made in $10^{15}$ bits received. In step 620, the transmitter sends a test signal from which a BER measurement may be made. The sequence is received at step 625, and in step 630, the BER is determined. The electrical filter is adjusted at step 645, and the procedure exits at step 650.

It will be clear to one skilled in the art that the algorithm in FIG. 6 may be combined with a tunable optical filter, and practiced together, in a manner to achieve optimal performance.

While this invention has been described in reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

The invention claimed is:

1. An optical transport system comprising:
   a laser transmitter configured to produce an optical signal;
   a modulator module optically coupled to the laser transmitter, wherein the modulator module is configured to modulate the optical signal in a return-to-zero format; and
   a receiver module optically coupled to the modulator module, wherein the receiver module is configured to receive and convert the optical signal into an electrical signal, and wherein the receiver module is further configured to filter noise from the electrical signal at a 3 dB bandwidth between about 0.4 to 0.6 times a bit rate to optimize a signal-to-noise ratio of the receiver module.

2. The optical transport system of claim 1, wherein the return-to-zero format has a duty cycle between about 10-60% at a predetermined bit rate.

3. The optical transport system of claim 1, wherein the 3 db bandwidth of the receiver module is fixed between about 0.4 to 0.6 times the bit rate.

4. The optical transport system of claim 1, wherein the 3 db bandwidth of the receiver module is tunable.

5. The optical transport system of claim 1, wherein the receiver module includes at least one electrical filter configured to provide the 3 db bandwidth between about 0.4 to 0.6 times the bit rate.

6. The optical transport system of claim 5, wherein the at least one electrical filter is tunable.

7. The optical transport system of claim 1, wherein the receiver module includes at least one optical filter.

8. The optical transport system of claim 7, wherein the at least one optical filter has a bandwidth of about 50 GHz.

9. The optical transport system of claim 1, wherein the receiver module includes a transducer configured to convert the optical signal into the electrical signal.

10. An optical receiver module comprising:
    a transducer configured to receive and convert an optical signal to an electrical signal, wherein the optical signal is modulated in a return-to-zero format; and
    a tunable filter optically coupled to the transducer, wherein the tunable filter is configured to filter the electrical signal at a 3 dB bandwidth between about 0.4 to 0.6 times a bit rate to optimize a signal-to-noise ratio of the optical receiver module.

11. The optical receiver module of claim 10, wherein the tunable filter comprises a tunable electrical filter.

12. The optical receiver module of claim 11, further including an optical filter optically coupled to the transducer.

13. The optical receiver module of claim 12, wherein the tunable electrical filter is configured to co-optimize its response with the optical filter.

14. A receiver module configured to receive an optical signal having a bit rate, the receiver module comprising:
    a transducer configured to receive and convert the optical signal into an electrical signal, wherein the optical signal is modulated in a return-to-zero format; and
    a filter connected to the transducer, wherein the filter is configured to filter the electrical signal at a 3 dB bandwidth between about 0.4 to 0.6 times the bit rate to optimize a signal-to-noise ratio of the receiver module.

15. A method of optimizing a performance of a receiver module, the method comprising:
    receiving an optical signal modulated in a return-to-zero format;
    converting the optical signal to an electrical signal; and
    tuning a filter to a 3 db bandwidth between about 0.4 to 0.6 times a bit rate to optimize a signal-to-noise ratio of the receiver module.

16. The method of claim 15, further comprising measuring a bit error rate.

17. The method of claim 15, wherein the filter comprises a tunable electrical filter.

18. The method of claim 15, further comprising tuning the filter until the filter is co-optimized with an optical filter in the receiver module.

19. The method of claim 15, further comprising balancing the filter with an optical filter in the receiver module.

20. The method of claim 19, further comprising passing the optical signal and at least one return-to-zero (RZ) sideband of the optical signal.

21. An optical receiver comprising:
    means for receiving an optical signal modulated in a return-to-zero format;
    means for converting the optical signal into an electrical signal; and
    means for filtering the electrical signal at a 3 db bandwidth between about 0.4 to 0.6 times a bit rate to optimize a signal-to-noise ratio of the optical receiver.

22. The optical receiver of claim 21, further comprising means for filtering the optical signal.

23. The optical receiver of claim 22, wherein the optical signal is filtered at a bandwidth of approximately 50 GHz.

24. The optical receiver of claim 21, further comprising means for tuning the 3 db bandwidth to about 0.4 to 0.6 times the bit rate.

25. The optical receiver of claim 21, further comprising means for converting the electrical signal into a digital signal.

26. The optical transport system of claim 9, wherein the receiver module includes decision circuitry configured to convert the electrical signal into a digital signal.

27. The optical receiver module of claim 10, wherein the optical receiver module includes decision circuitry optically coupled to the tunable filter, and wherein the decision circuitry is configured to convert the electrical signal into a digital signal.

28. The receiver module of claim 14, wherein the filter is tunable.

29. The receiver module of claim 14, further comprising decision circuitry connected to the filter, wherein the decision circuitry is configured to convert the electrical signal into a digital signal.

30. The receiver module of claim 14, further comprising an optical filter connected to the transducer, wherein the optical filter is configured to filter the optical signal.

31. The method of claim 15, further comprising converting the electrical signal into a digital signal.

* * * * *

UNITED STATES PATENT AND TRADEMARK OFFICE
CERTIFICATE OF CORRECTION

PATENT NO.          : 8,494,372 B2                                      Page 1 of 1
APPLICATION NO.     : 10/427210
DATED               : July 23, 2013
INVENTOR(S)         : Eiselt et al.

It is certified that error appears in the above-identified patent and that said Letters Patent is hereby corrected as shown below:

In the Specifications

In Column 1, Line 25, delete "modem" and insert -- modern --, therefor.

In Column 3, Line 22, delete "6000 IAN," and insert -- 6000 km, --, therefor.

In Column 4, Line 17, delete "waveform 230" and insert -- waveform 240 --, therefor.

In Column 4, Line 19, delete "waveform 230" and insert -- waveform 240 --, therefor.

In Column 4, Lines 44-45, delete "2 $V_{90}$." and insert -- 2 $V_{\pi}$. --, therefor.

Signed and Sealed this
First Day of April, 2014

Michelle K. Lee
*Deputy Director of the United States Patent and Trademark Office*